(12) United States Patent
Biring

(10) Patent No.: US 8,421,990 B2
(45) Date of Patent: Apr. 16, 2013

(54) LIQUID CRYSTAL LENS

(75) Inventor: Sajal Biring, Hsinchu (TW)

(73) Assignee: Silicon Touch Technology Inc., Science-Based Industrial Park, Hsin-Chu (TW)

( * ) Notice: Subject to any disclaimer, the term of this patent is extended or adjusted under 35 U.S.C. 154(b) by 108 days.

(21) Appl. No.: 13/094,830

(22) Filed: Apr. 27, 2011

(65) Prior Publication Data

US 2012/0274891 A1 Nov. 1, 2012

(51) Int. Cl.
*G02F 1/13* (2006.01)
(52) U.S. Cl.
USPC ........................................................ 349/200
(58) Field of Classification Search .................... 349/200
See application file for complete search history.

(56) References Cited

U.S. PATENT DOCUMENTS 6,778,246 B2 * 8/2004 Sun et al. ...................... 349/146
8,184,218 B2 * 5/2012 Galstian et al. ................. 349/23

FOREIGN PATENT DOCUMENTS

| JP | H0553089 A | | 3/1993 |
|---|---|---|---|
| JP | 05100201 A | * | 4/1993 |
| JP | 2001194636 A | | 7/2001 |
| JP | 2007122844 A | | 5/2007 |

* cited by examiner

*Primary Examiner* — James Dudek
(74) *Attorney, Agent, or Firm* — Winston Hsu; Scott Margo

(57) ABSTRACT

A liquid crystal lens includes a first light-pervious plate, a second light-pervious plate, a first electrode layer arranged on the first light-pervious plate, a second electrode layer arranged on the second light-pervious plate, and a liquid crystal layer sandwiched between the first light-pervious plate and the second light-pervious plate, where the first electrode layer comprises a plurality of concentric electrodes, and a gap between two adjacent outer concentric electrodes is different from a gap between two adjacent inner concentric electrodes.

8 Claims, 6 Drawing Sheets

LIQUID CRYSTAL LENS

BACKGROUND OF THE INVENTION

1. Field of the Invention

The present invention relates to a liquid crystal lens, and more particularly, to a liquid crystal lens having a plurality of concentric electrodes, where a gap between two adjacent outer concentric electrodes is different from a gap between two adjacent inner concentric electrodes.

2. Description of the Prior Art

Liquid crystal (LC) lens technology is one of the most promising technologies exploiting the unique physical and optical properties of liquid crystal materials. Unlike a conventional glass lens, the LC lens can converge or diverge incident light rays according to an electric field applied thereon. In particular, a focal length of the LC lens can be tuned by varying the applied voltage. Since no mechanical motions are needed to adjust the focal length, the LC lens has many advantages over glass lenses and can be used in all types of image capturing techniques.

Please refer to FIG. 1(A). FIG. 1(A) is a diagram illustrating a prior art LC lens structure 100. The LC lens structure 100 includes two glass layers 110 and 120, two ITO (Indium-Tin Oxide) electrode layers 112 and 122 respectively formed on the glass layers 110 and 120, and an LC layer 130. FIG. 1(B) is a top view of the ITO electrode layer 112, where the ITO electrode layer 112 is patterned to have a circular hole. To achieve the lens effect, it is necessary to shape the electric field inside the LC layer 130 similar to a curvature of the glass lens. As illustrated by referring to the electric field shown in FIG. 1(C), however, the LC lens structure 100 does not provide a required shape of the electric field inside the LC layer 130.

To improve the lens effect of the LC lens structure 100, a concentric ring design shown in FIG. 2 is provided. FIG. 2(A) is a diagram illustrating another prior art LC lens structure 200. The LC lens structure 200 includes two glass layers 210 and 220, two ITO electrode layers 212 and 222 respectively formed on the glass layers 210 and 220, and an LC layer 230. FIG. 2(B) is a top view of the ITO electrode layer 212, where the ITO electrode layer 112 is patterned to have concentric rings, and the concentric rings are supplied by different control voltages $V_1$-$V_3$. Although the shape of the electric field inside the LC lens layer 230 shown in FIG. 2(C) is better than that of the LC lens layer 130 shown in FIG. 1(C), design of the LC lens structure 200 is more complicated because more control voltages $V_1$-$V_3$ are needed.

SUMMARY OF THE INVENTION

It is therefore an objective of the present invention to provide an LC lens, having a simple design and a shape of the electric field inside an LC layer that is largely similar to a curvature of the glass lens, in order to solve the above-mentioned problems.

According to one embodiment of the present invention, a liquid crystal lens comprises a first light-pervious plate, a second light-pervious plate, a first electrode layer arranged on the first light-pervious plate, a second electrode layer arranged on the second light-pervious plate, and a liquid crystal layer sandwiched between the first light-pervious plate and the second light-pervious plate, where the first electrode layer comprises a plurality of concentric electrodes, and a gap between two adjacent outer concentric electrodes is different from a gap between two adjacent inner concentric electrodes.

According to another embodiment of the present invention, a liquid crystal lens comprises a first light-pervious plate, a second light-pervious plate, a first electrode layer arranged on the first light-pervious plate, a second electrode layer arranged on the second light-pervious plate, and a liquid crystal layer sandwiched between the first light-pervious plate and the second light-pervious plate, where the first electrode layer comprises a spiral electrode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
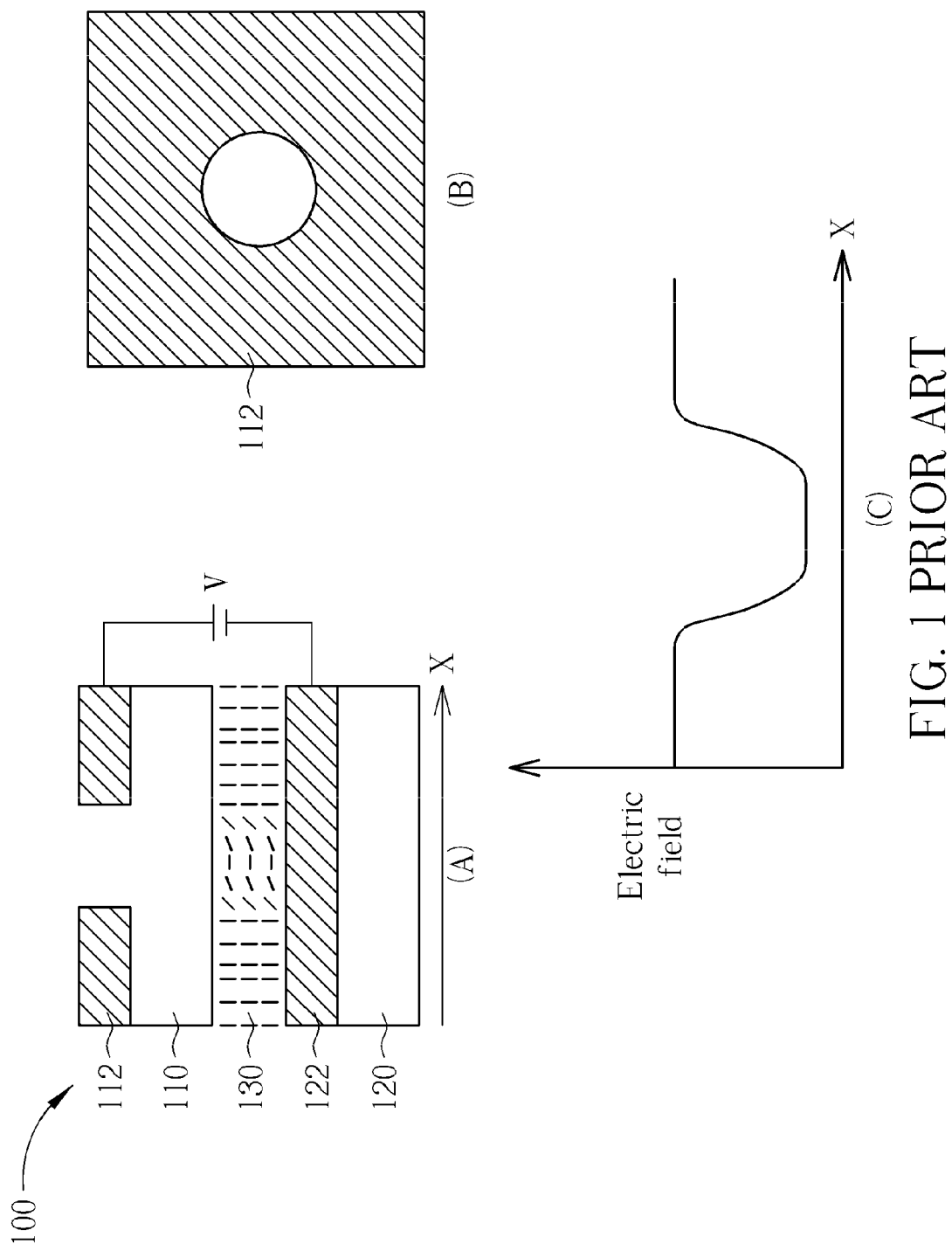
FIG. 1(A) is a diagram illustrating a prior art LC lens structure.
FIG. 1(B) is a top view of an ITO layer of the LC lens structure shown in FIG. 1(A).
FIG. 1(C) shows a shape of an electric field inside an LC layer of the LC lens structure shown in FIG. 1(A).
Figure 2:
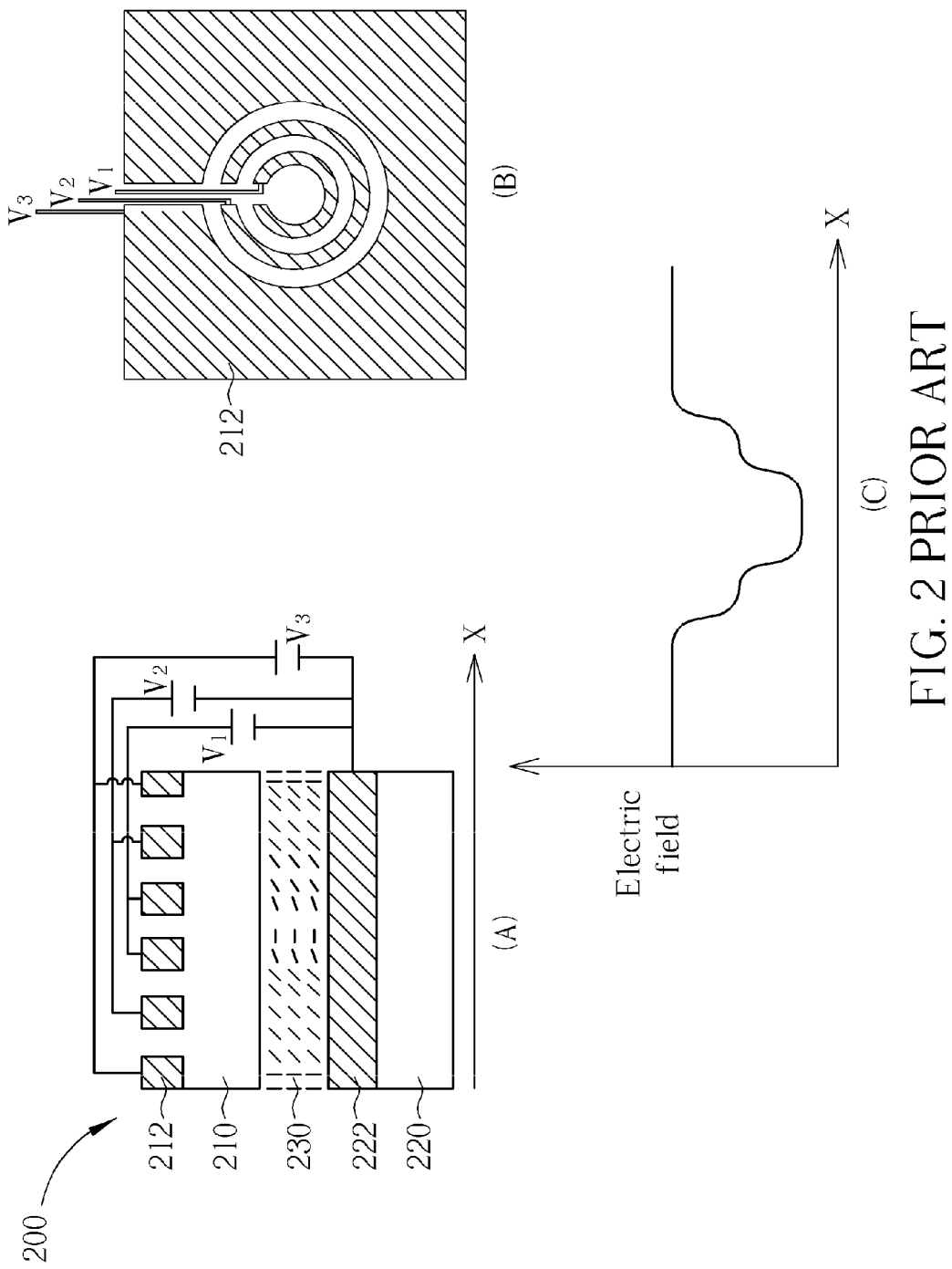
FIG. 2(A) is a diagram illustrating a prior art LC lens structure.
FIG. 2(B) is a top view of an ITO layer of the LC lens structure shown in FIG. 2(A).
FIG. 2(C) shows a shape of an electric field inside an LC layer of the LC lens structure shown in FIG. 2(A).
Figure 3:
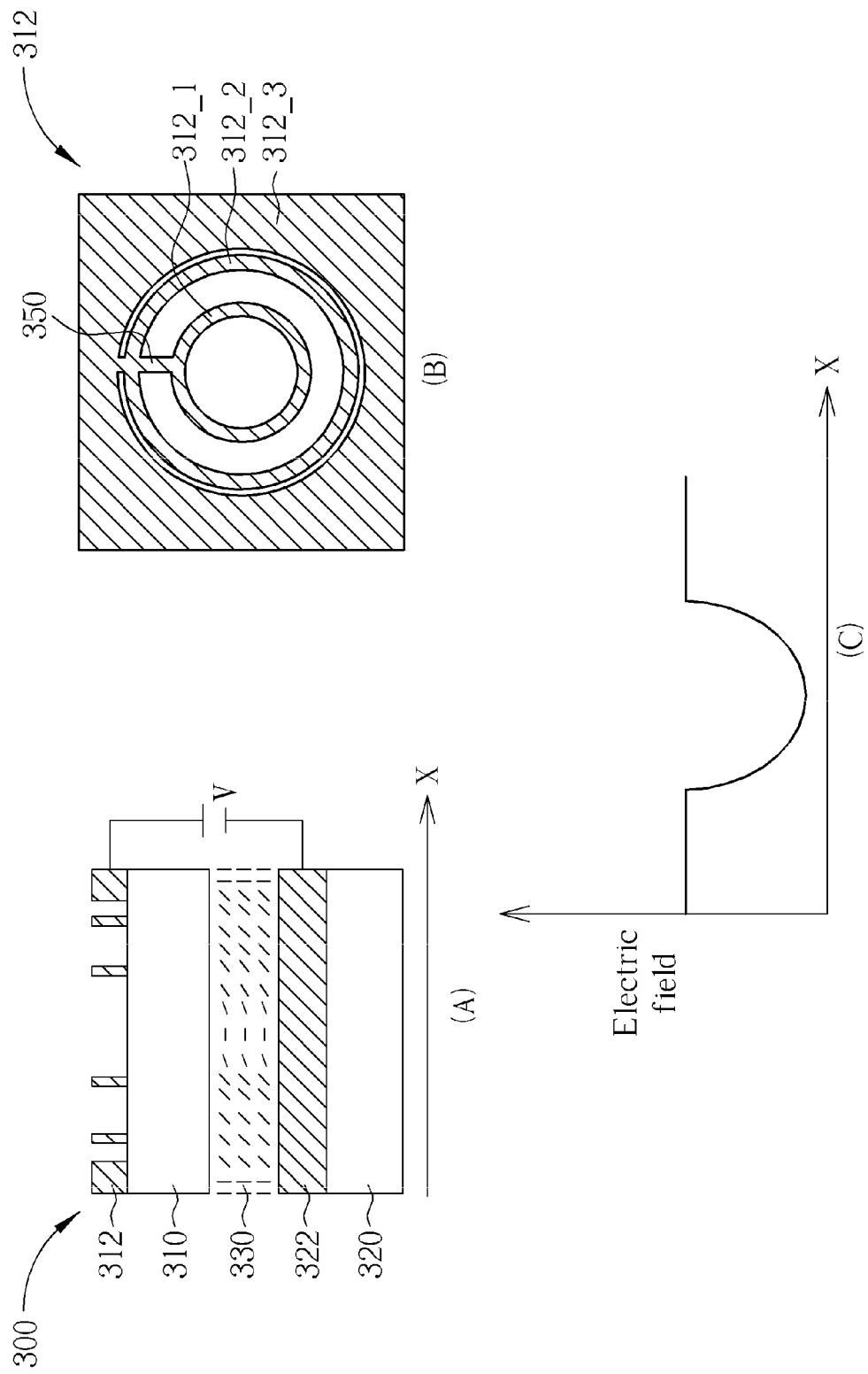
FIG. 3(A) is a diagram illustrating an LC lens according to one embodiment of the present invention.
FIG. 3(B) is a top view of an ITO layer of the LC lens structure shown in FIG. 3(A).
FIG. 3(C) shows a shape of an electric field inside an LC layer of the LC lens structure shown in FIG. 3(A).

Please refer to FIG. 3(A). FIG. 3(A) is a diagram illustrating an LC lens 300 according to one embodiment of present invention. As shown in FIG. 3(A), the LC lens 300 comprises two glass layers 310 and 320, two ITO electrode layers 312 and 322 respectively arranged on the glass layers 310 and 320, and an LC layer 330. FIG. 3(B) is a top view of the ITO electrode layer 312, where the ITO electrode layer comprises a plurality of concentric ring electrodes (in this embodiment, there are three concentric ring electrodes 312_1 -312_3), and gaps between each two adjacent concentric ring electrode are gradually decreased along an outward radial direction of the concentric ring electrodes, where the term "gap" here means a minimum distance. In addition, a strip 350 is used to connect the concentric ring electrodes 312_1-312_3, and the concentric ring electrodes 312_1 -312_3 are supplied with a single voltage V.

Please note that, in this embodiment, the glass layers 310 and 320 can be replaced by any other light-pervious plates, and the ITO electrode layers 312 and 322 can be replaced by any other transparent electrodes.

In addition, the concentric ring electrodes 312_1-312_2 can be designed to have the same annular width, and the annular width of each concentric ring electrode can be designed to be much smaller than the gap between two concentric ring electrodes to increase the aperture of the LC lens.

FIG. 3(C) is a diagram illustrating an electric field inside the LC layer 330. Referring to FIG. 3(C), the shape of the electric field inside the LC layer 330 is largely similar to a curvature of a conventional glass lens. Therefore, the LC lens 300 has a better lens effect. Furthermore, because the ITO layer 310 is supplied by a single voltage source, design of the LC lens 300 and surrounding circuits is simplified.

In addition, although the ITO layer 310 shown in FIG. 3(A) is patterned to have a plurality of concentric ring electrodes, this is not meant to be a limitation of the present invention. In other embodiments, the ITO layer can be patterned to have any other concentric electrodes such as concentric ellipse electrodes 412_1-412_3 shown in FIG. 4. These alternative designs should fall within the scope of the present invention.

The strip 350 between the concentric ring electrodes 312_1-312_3 may cause electrical disturbances in the LC layer 330, and may also produce an undesired bending of the light rays. Therefore, to solve this problem, the width of the strip 350 is designed at the nanometer scale. In addition, another way to prevent from producing undesired bending of the light rays is to distribute the strips 550_1 and 550_2 evenly among the concentric ring electrodes 512_1-512_3 as shown in FIG. 5.

Figure 6:
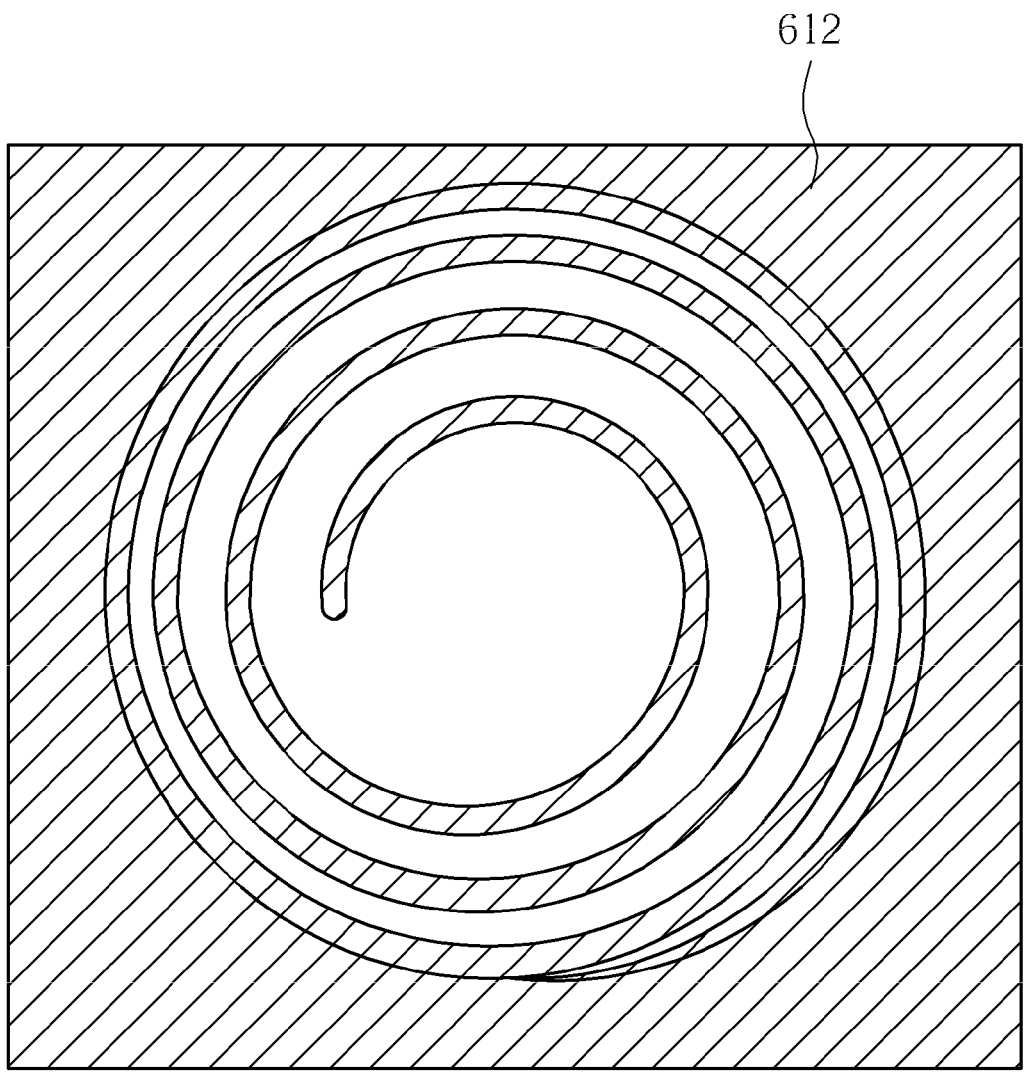
FIG. 6 is diagram illustrating a top view of an ITO layer comprising a spiral electrode according to one embodiment of the present invention.

In addition, the ITO layer can also be patterned to have a spiral electrode 612 as shown in FIG. 6, where gaps of the spiral electrode are gradually decreased along an outward radial direction of the spiral electrode.

Figure 4:
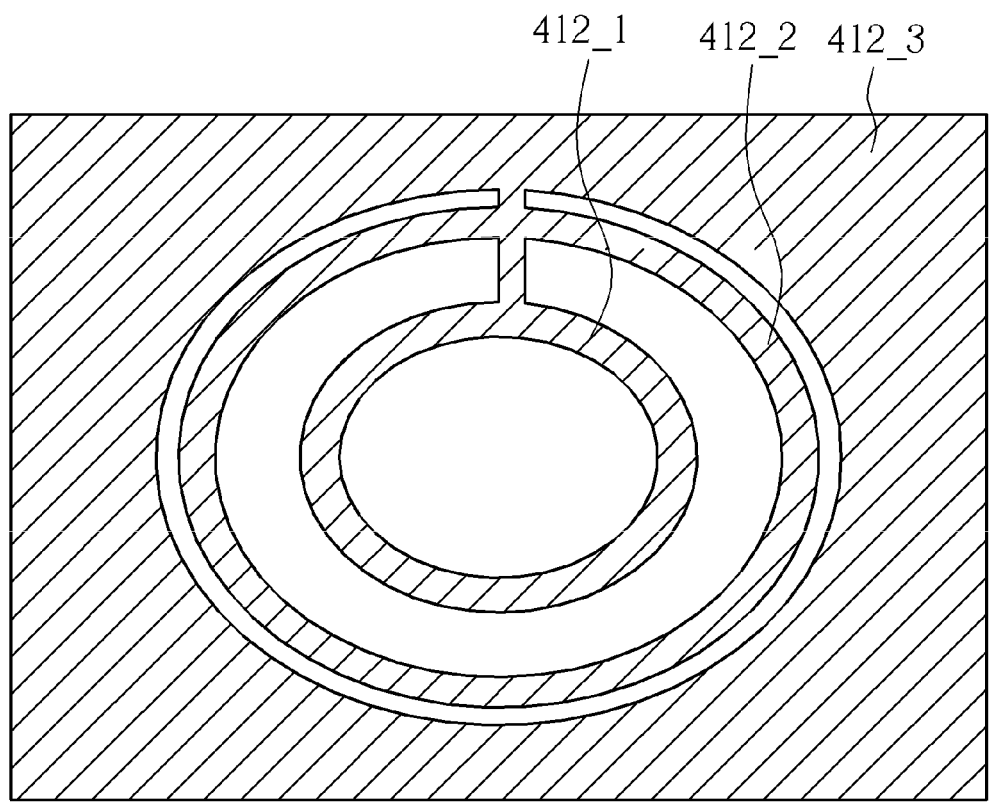
FIG. 4 is a diagram illustrating a top view of an ITO layer comprising a plurality of concentric ellipse electrodes according to one embodiment of the present invention.
Figure 5:
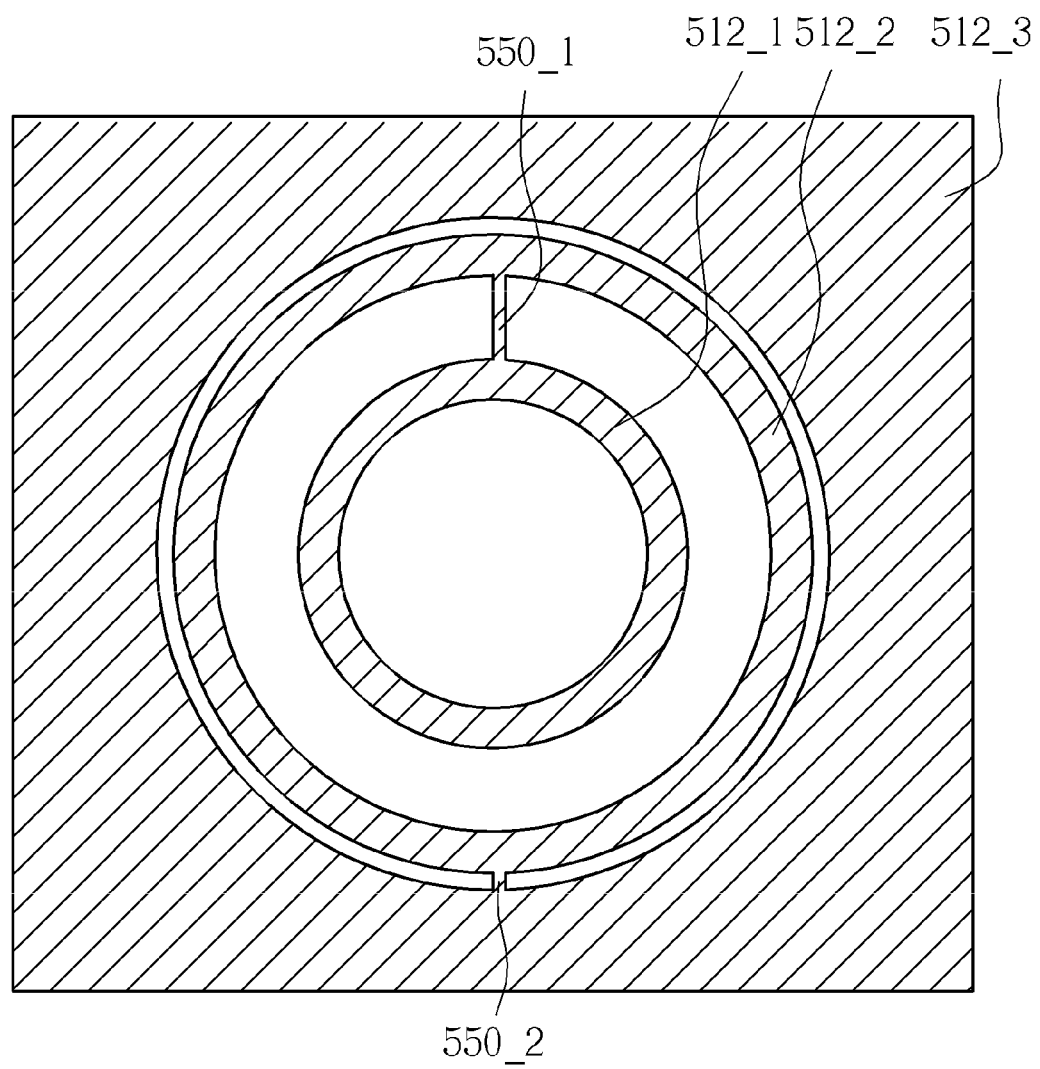
FIG. 5 is a diagram illustrating a top view of an ITO layer comprising strips distributed evenly among concentric ellipse electrodes according to one embodiment of the present invention.

In addition, two or more ITO patterns as shown in FIG. 3(B), FIG. 4, FIG. 5 and/or FIG. 6 can be arranged on the glass layer side-by-side to form a special shape of the electric field inside the LC layer. These alternative designs also fall within the scope of the present invention.

Briefly summarized, in the present invention, the ITO layer of the LC lens comprises a plurality of concentric electrodes or a spiral electrode, and an outer gap of the electrodes is smaller than an inner gap of the electrodes. In addition, the ITO layer of the LC lens is supplied by a single voltage source. Therefore, the shape of the electric field inside the LC layer is largely similar to a curvature of a conventional glass lens, and designs of the LC lens 300 and surrounding circuits are simplified.

Those skilled in the art will readily observe that numerous modifications and alterations of the device and method may be made while retaining the teachings of the invention.

What is claimed is:

1. A liquid crystal lens, comprising:
   a first light-pervious plate;
   a second light-pervious plate;
   a first electrode layer, arranged on the first light-pervious plate, wherein the first electrode layer comprises a plurality of concentric electrodes, and a gap between two adjacent outer concentric electrodes is smaller than a gap between two adjacent inner concentric electrodes;
   a second electrode layer, arranged on the second light-pervious plate; and
   a liquid crystal layer, sandwiched between the first light-pervious plate and the second light-pervious plate.

2. The liquid crystal lens of claim 1, wherein gaps between each two adjacent concentric electrodes are gradually decreased along an outward radial direction of the concentric electrodes.

3. The liquid crystal lens of claim 1, wherein the concentric electrodes are connected to each other by at least a strip, and the concentric electrodes are supplied by a single voltage source.

4. The liquid crystal lens of claim 3, wherein the concentric electrodes are connected to each other by a plurality of strips, and the strips are distributed evenly among the concentric electrodes.

5. The liquid crystal lens of claim 1, wherein the concentric electrodes are concentric ring electrodes.

6. The liquid crystal lens of claim 1, wherein the concentric electrodes are concentric ellipse electrodes.

7. A liquid crystal lens, comprising:
   a first light-pervious plate;
   a second light-pervious plate;
   a first electrode layer, arranged on the first light-pervious plate, wherein the first electrode layer comprises a spiral electrode, and an outer gap of the spiral electrode is smaller than an inner gap of the spiral electrode;
   a second electrode layer, arranged on the second light-pervious plate; and
   a liquid crystal layer, sandwiched between the first light-pervious plate and the second light-pervious plate.

8. The liquid crystal lens of claim 7, wherein gaps of the spiral electrode are gradually decreased along an outward radial direction of the spiral electrode.

* * * * *